(12) United States Patent
Van Dijk et al.

(10) Patent No.: US 10,116,438 B1
(45) Date of Patent: *Oct. 30, 2018

(54) MANAGING USE OF SECURITY KEYS

(71) Applicant: EMC IP Holding Company LLC, Hopkinton, MA (US)

(72) Inventors: Marten E. Van Dijk, Somerville, MA (US); Todd A. Morneau, Sudbury, MA (US); William M. Duane, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,087

(22) Filed: Aug. 23, 2017

Related U.S. Application Data

(63) Continuation of application No. 13/731,455, filed on Dec. 31, 2012, now Pat. No. 9,774,446.

(51) Int. Cl.
*H04L 9/08* (2006.01)
*G06F 11/30* (2006.01)

(52) U.S. Cl.
CPC ............... *H04L 9/08* (2013.01); *H04L 9/083* (2013.01); *H04L 9/0816* (2013.01); *H04L 9/0897* (2013.01)

(58) Field of Classification Search
CPC ..... H04L 9/083; H04L 9/0897; H04L 9/0816; H04L 9/08
See application file for complete search history.

(56) References Cited

U.S. PATENT DOCUMENTS

| | | | | |
|---|---|---|---|---|
| 5,495,533 A | * | 2/1996 | Linehan | G06F 21/31 380/277 |
| 6,625,734 B1 | * | 9/2003 | Marvit | H04L 51/34 380/277 |
| 6,829,711 B1 | * | 12/2004 | Kwok | G06F 21/32 713/176 |
| 7,111,172 B1 | * | 9/2006 | Duane | H04L 63/0272 380/277 |
| 7,454,794 B1 | * | 11/2008 | Hibberd | G06F 21/313 709/217 |
| 8,437,742 B2 | * | 5/2013 | Garskof | G06F 21/35 455/411 |
| 8,572,391 B2 | * | 10/2013 | Golan | G06F 21/40 705/72 |
| 8,745,698 B1 | * | 6/2014 | Ashfield | H04L 63/08 726/4 |
| 9,071,621 B2 | * | 6/2015 | Kong | G06F 21/629 |
| 2002/0126850 A1 | * | 9/2002 | Allen | H04L 9/0825 380/277 |
| 2002/0131601 A1 | * | 9/2002 | Ninomiya | H04L 9/0822 380/277 |
| 2003/0147536 A1 | * | 8/2003 | Andivahis | H04L 63/06 380/277 |

(Continued)

*Primary Examiner* — Michael Simitoski
(74) *Attorney, Agent, or Firm* — Krishnendu Gupta; Jason A. Reyes

(57) ABSTRACT

A method is used in managing use of security keys. Based on a request for use of a key that serves as part of a data security system, a set of criteria to apply to the request is determined. The set of criteria pertain to security management of the key that is subject of the request. The set of criteria is applied to the request; and a result is determined based on the application of the set of criteria.

3 Claims, 2 Drawing Sheets

(56) References Cited

U.S. PATENT DOCUMENTS

| | | | |
|---|---|---|---|
| 2003/0226015 A1* | 12/2003 | Neufeld | G06F 21/305 713/166 |
| 2005/0272445 A1* | 12/2005 | Zellner | H04L 41/12 455/456.2 |
| 2007/0297610 A1* | 12/2007 | Chen | H04L 9/0822 380/270 |
| 2008/0039140 A1* | 2/2008 | Morris | H04L 9/0825 455/558 |
| 2008/0072283 A1* | 3/2008 | Relyea | G06F 21/31 726/2 |
| 2008/0091934 A1* | 4/2008 | Peterson | G06F 21/6281 713/2 |
| 2008/0098478 A1* | 4/2008 | Vaidya | G06F 21/34 726/24 |
| 2008/0133905 A1* | 6/2008 | Challener | H04L 9/0822 713/156 |
| 2008/0140576 A1* | 6/2008 | Lewis | G06Q 10/0635 705/67 |
| 2008/0162159 A1* | 7/2008 | Wang | G06Q 99/00 705/1.1 |
| 2009/0034733 A1* | 2/2009 | Raman | H04L 9/32 380/277 |
| 2009/0077618 A1* | 3/2009 | Pearce | H04L 63/0892 726/1 |
| 2009/0112967 A1* | 4/2009 | Amano | G06F 21/6218 709/201 |
| 2009/0199264 A1* | 8/2009 | Lang | G06F 21/31 726/1 |
| 2009/0227232 A1* | 9/2009 | Matas | H04M 1/665 455/411 |
| 2010/0023782 A1* | 1/2010 | Prakash | G06F 21/6218 713/193 |
| 2010/0115625 A1* | 5/2010 | Proudler | G06F 21/445 726/27 |
| 2010/0131668 A1* | 5/2010 | Kamath | H04L 47/32 709/233 |
| 2010/0175116 A1* | 7/2010 | Gum | G06F 21/31 726/6 |
| 2011/0016534 A1* | 1/2011 | Jakobsson | G06F 21/316 726/28 |
| 2011/0022414 A1* | 1/2011 | Ge | G06Q 10/00 705/3 |
| 2011/0058675 A1* | 3/2011 | Brueck | H04N 21/2541 380/277 |
| 2011/0131325 A1* | 6/2011 | Piccionelli | G06F 17/3087 709/225 |
| 2011/0213797 A1* | 9/2011 | Hess | G06F 17/30389 707/769 |
| 2011/0314549 A1* | 12/2011 | Song | G06F 21/31 726/25 |
| 2012/0179916 A1* | 7/2012 | Staker | G06F 21/53 713/189 |
| 2013/0047197 A1* | 2/2013 | Saroiu | G06F 21/6209 726/1 |
| 2013/0159704 A1* | 6/2013 | Chandrasekaran | G06F 21/57 713/156 |
| 2013/0340052 A1* | 12/2013 | Jakobsson | G06F 21/33 726/5 |
| 2013/0347058 A1* | 12/2013 | Smith | G06F 21/57 726/1 |
| 2014/0012091 A1* | 1/2014 | Reynolds | G06F 19/328 600/300 |
| 2014/0137178 A1* | 5/2014 | Thom | G06F 21/6218 726/1 |

* cited by examiner

MANAGING USE OF SECURITY KEYS

RELATED APPLICATION

This application is a continuation of co-pending U.S. patent application Ser. No. 13/731,455, entitled MANAGING USE OF SECURITY KEYS, filed Dec. 31, 2012, the entirety of both patent application hereby incorporated by reference herein.

BACKGROUND

The present invention is related to managing use of security keys.

There is increasing need for data security and security keys in data processing systems. Current techniques include, for example, encryption of user data, which can help protect the user data even in the event that it is obtained by an unauthorized party. Data processing systems (including storage systems) that provide data security such as user data encryption generally utilize a large number of security keys such as data encryption keys, and require resources for the secure creation, distribution, use and destruction of these security keys. Many systems may employ one or more dedicated key management server systems which are responsible for such key management activities.

SUMMARY

A method is used in managing use of security keys. Based on a request for use of a key that serves as part of a data security system, a set of criteria to apply to the request is determined. The set of criteria pertain to security management of the key that is subject of the request. The set of criteria is applied to the request; and a result is determined based on the application of the set of criteria.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Described below is a technique for use in managing use of security keys. In at least one implementation, the technique may be used to help provide for, among other things, black listing access patterns.

For example, in at least one implementation as further described below, a key manager (KM) may be used that releases keys according to a policy that includes rules that are based on the current time and date and the history (access pattern) of when and to whom keys were released previously. Such a rule may indicate, for example, that additional authentication factors are necessary.

At least one implementation based on the technique as described herein improves the security at end-point devices.

In at least one use case an implementation of the technique may use or be built into a portable processing device such as a security token.

Figure 1:
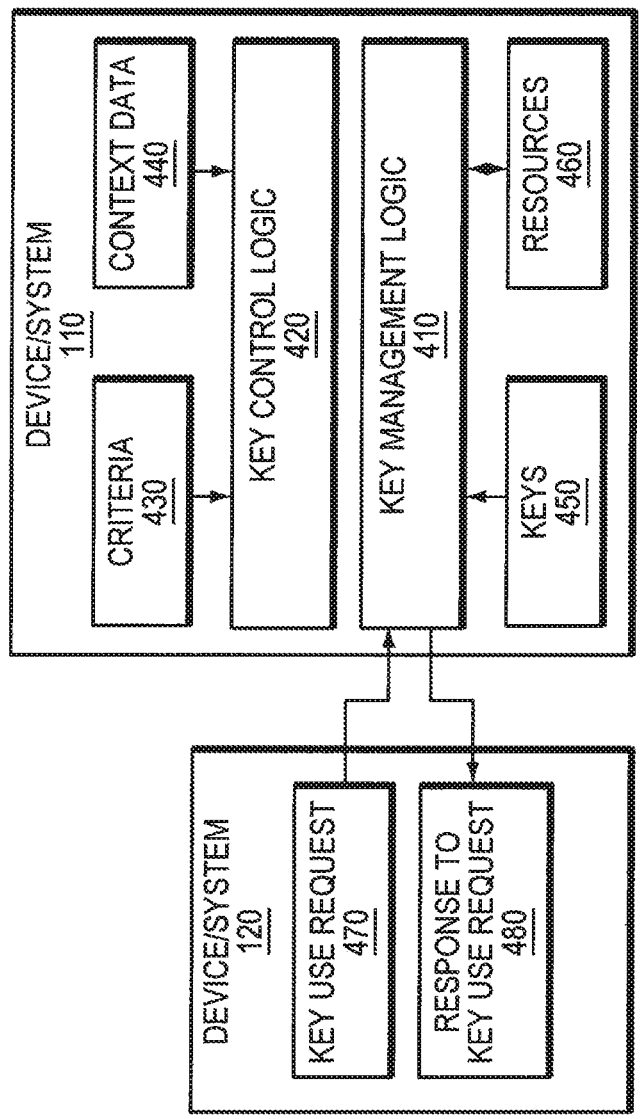
FIGS. 1-2 are block diagrams showing computerized systems that may be used with the technique described herein.

FIG. 1 illustrates an example implementation in which device/system 120 issues a key use request 470 to device/system 110 and receives a response to key use request 480. At device 110, key management logic 410 receives request 470 and, after some processing at device 110, issues response 480.

In the implementation of FIG. 1, logic 410 determines whether and/or how to use keys 450 based on key control logic 420 and, as needed, resources 460 such as data encrypting/decrypting logic or software. Logic 420 helps drive logic 410 based on criteria 430 and/or context data 440. As described in more detail below, criteria 430 may include, for example, rules, conditions, and/or filters, and data 440 may include data indicating time, location, access and/or request history, other activities, and/or other information.

In an example, request 470 may include data to be decrypted, and logic 410 may use one or more of keys 450 and decryption logic of resources 460 to decrypt the data and return such decrypted data in response 480, if permitted by logic 420. Logic 420 may or may not grant such permission depending on request-related time of day or location data of data 440, and/or on whether request 470 meets certain of criteria 430 such as restrictions based on location and time of day.

Figure 2:
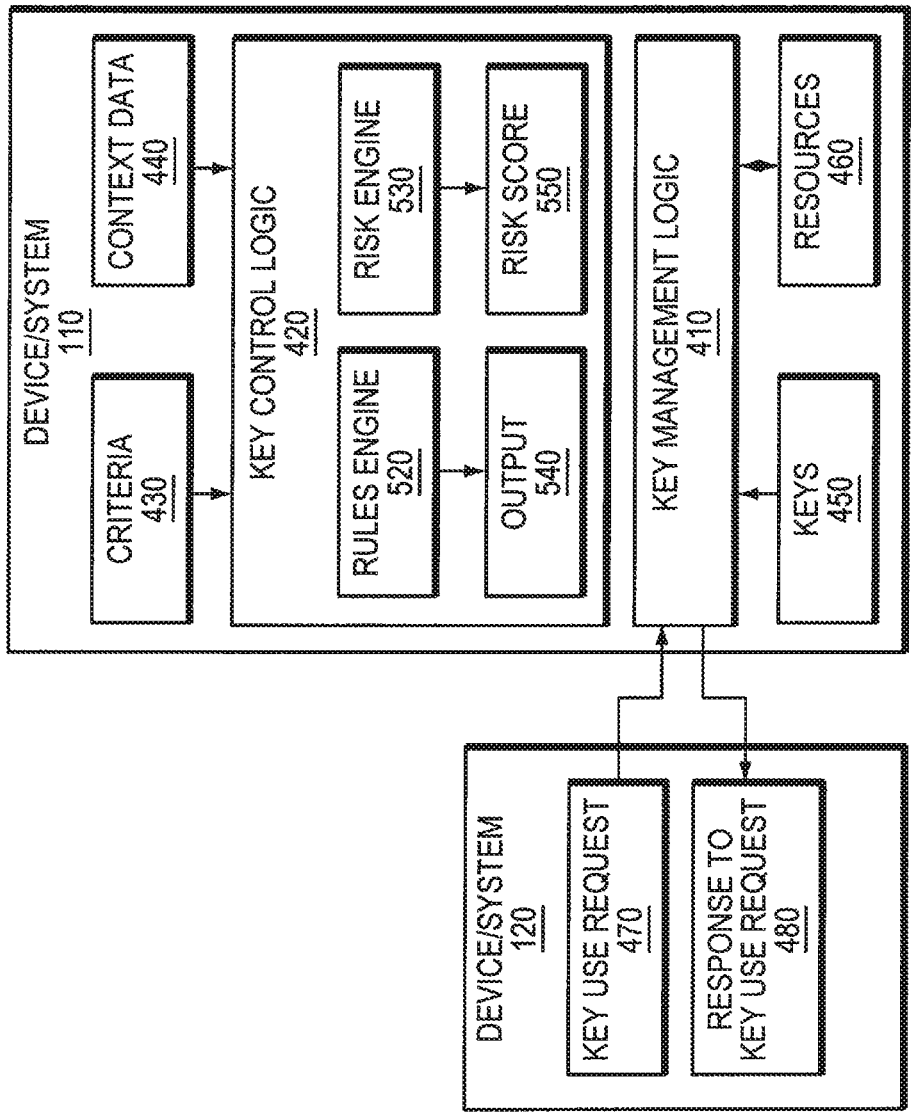

FIG. 2 illustrates another example implementation which is a variation of the example of FIG. 1. In the variation, logic 420 has rules engine 520 that produces output 540, and/or has risk engine 530 that produces risk score 550.

For example, criteria 430 may include rules and/or policies enforced by engine 520 based on data 440. Such rules may require that output 540 cause denial of request 470 depending on the location of the requestor, the time of day, and/or the access history of the key or keys that are the subject of the request, as indicated by data 440.

In another example, criteria 430 may include weighting of risk factors used by engine 530 to produce risk score 550. Such factors may require score 550 to indicate a higher risk depending on the location of the requestor, the time of day, and/or the access history of the key or keys that are the subject of the request, as indicated by data 440.

In another example, criteria 430 may include rules enforced by engine 520 based on data 440, and may include weighting of risk factors used by engine 530 to produce risk score 550, wherein score 550 is an input to engine 520. In such example, output 540 may indicate that request 470 should be completely or partially denied at least in part because score 550 indicates excessive risk.

In a specific implementation, a black listing access patterns feature is provided as follows.

A key manager such as logic 410, 420 is used that releases keys 450 according to a policy that includes rules within criteria 430 that are based on the current time and date and the history (access pattern) of when and to who keys were released. Such a rule may indicate that additional authentication factors are necessary.

The key manager may be, include, or be included in a mobile device, for example, a USB stick storing keys with hardware implementing an access policy based on a third party cloud service and a trustworthy time base established within the key manager.

If a personal device such a company laptop is directed to decrypt a file or other sensitive data encrypted under a key, the personal device may request the key from the key manager and if the key is received by the personal device, decryption is possible.

After decryption, the key may be discarded, e.g., in a case in which the key is used to protect other sensitive data as well, the key may be discarded in order to reduce an attack surface. As soon as the file or sensitive data (e.g., in updated form) needs to be re-encrypted (e.g., together with possibly a new version number), the device may ask the key manager for an encryption key.

The key manager decides to release the key according to one or more policies. In at least one implementation, such policies include some time-based rules, e.g.:

a. The same device or group of devices cannot get access to more than a maximum number of keys within a short time frame. This helps to block a type of access pattern referred to as burst behavior that may indicate malicious software searching for valuable sensitive data.

b. Every 24 hours at most a limited number of keys are released.

c. Depending on the geography and day/night time, keys are allowed to be accessed more or less frequently.

In a specific implementation, the policies may include a white list of access patterns and/or a black list of access patterns. The key manager may include logic that learns the owner's behavior with respect to the owner's access patterns. The policy may be dynamic in that it can be changed pro-actively given external factors or given feedback about legitimate (or illegitimate) user behavior.

A time-based rule may initially lead to denying a device access to a key. In such circumstances the device/user may need to provide additional factors of authentication in order to get access to the key.

Rather than releasing a key to an external device, the key manager may only release keys internally for decrypting files for the device. For example, a security token may play the role of decryption device as well as the key manager.

In general, at least some implementations involve black listing certain access patterns: e.g., malicious software may ask in a short burst to get access to many keys, and if the key manager prohibits too many accesses to keys in a short time period, the malicious software may only be able to get keys at a very low rate. This means that the malicious software needs to maintain its presence for a longer time, which increases the probability of its detection.

With respect to the security token, if the token has sufficient processing power, much or all of the functionality of FIGS. 1-2 may be implemented in and provided by the token.

In general, in accordance with the technique described herein, a key distribution point uses risk based analytics approach to decide whether to release keys or perform operations such as decryption.

In a first model, a client such as a laptop computer makes a request to a device such as a security token, which device contains the key manager and enforces one or more policies, makes a decision whether to release the key, and releases the key to the client. In a second model, the device has the functionality and ability to perform decryption on its own, so that the client makes the request which includes encrypted data, and the device decides based on policy and criteria whether to use the key to decrypt the data, and if the decision is to proceed, decrypts the data and returns the decrypted data.

One or more implementations that use the technique described herein may have one or more of the following features. After each use, decrypted data may be re-encrypted using a different key, to help avoid unauthorized release of information. Example policies may include a rate limiter restricting keys released and/or accesses to one or keys to a maximum number per time period (e.g., 24 hours), and a non-release policy for certain geographical locations and/or time of day.

Logic implementing the technique may be included within a security token such as a smart token that has computer processing ability, or other mobile device, and the logic may include the key manager and policy enforcement logic. A notebook computer or other client may make requests for key use to the mobile device.

Where the implementation includes the risk engine, a policy may use a risk evaluation and/or risk score calculation of risk as an input to produce a policy or rule based output.

In general, the technique may be used as a result of or as part of or in support of situationally aware authentication (SAA), which takes situational factors into account in processing an authentication request.

At least some of the risk evaluation or risk score calculation, e.g., used in SAA, may be performed on behalf of the client by the mobile device, or may be performed elsewhere, e.g., by a cloud-based service, and communicated to or through the mobile device.

Keys managed by use of the technique described herein may include, for example, one or more encryption keys and/or one or more signing keys.

In general, in accordance with the technique described herein, a device releases keys or uses keys on behalf of a client, based on whether a request and/or the context or the situation of the request successfully meet a set of criteria.

Example applications making use of the technique described herein may include one or more of the following. A token based authentication system may have a server that may use the technique to help control access to seed records of a seed database. A security system may use the technique to help determine whether a key (e.g., a multi-use key) should be shredded automatically in certain circumstances, so that the key is not available at all for use in accessing the data or resource protected by the key. In a variation, shredding may be combined with a prompt for a new key so that the data or resource can be accessed via the new key but no longer via the old key.

With respect to the risk calculation, depending on the implementation and the policy engine, a higher risk score may cause the system to impose a reduced rate at which keys are released for use, to reduce the ability to access keys having higher sensitivity to risk, to prevent access to keys except by an administrator.

In at least some cases, a proper model of key management requires that every time an action is to be taken with data or a resource protected by a key, it is necessary to interact with the key manager either to get the key, or to send data for encryption or decryption In another specific example implementation, the key manager holds the keys and enforces policy, and a smart token is plugged in a trusted partner node, wherein a key is released to the smart token, not to the client (e.g., notebook computer). In such implementation, a cloud based decryption system need not require that all data be transmitted to the cloud for decryption, which may be impractical or expensive with respect to bandwidth, and/or insecure; instead, the data need not leave the client area if there is a trust relationship between the cloud and the smart token.

One or more of systems 110, 120 may include a controller that includes a processor which takes the form of, but is not limited to, Intel or AMD-based MPUs, and can include a single or multi-cores each running single or multiple threads. The processor may be coupled to a memory and includes risk score engine 530 constructed and arranged to assign risk score 550 to request 470 based on at least context data 440.

At this point, it should be understood that the controller is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. A computer program product of one or more of systems 110, 120 has a non-transitory (or non volatile) computer readable medium which stores a set of instructions which controls one or more controller operations. Examples of suitable computer readable storage media include tangible articles of manufacture and apparatus which store instructions in a non volatile manner such as CD ROM, flash memory, disk memory, tape memory, and the like.

In at least some embodiments, system 120 may communicate with system 110 over any of a plurality of communication media. It will be appreciated that various media may be considered by system 110 to be more or less risky. For example, a network route to system 110 that traverses the Internet before arriving at system 110 may cause engine 530 to modify a transaction risk score up or down accordingly. In another embodiment, the network route may include a cellular telephone provider which also may cause engine 530 to modify the risk score.

The technique may include capturing a location history in connection the request 470. The location history may include a record of discrete locations from which such requests have been made over a period of time. It will be understood that system 120 may be associated with the user such that as the user travels the system 120 will be assumed to visit discrete locations emulating the user's movement. It will be appreciated that in at least some embodiments system 110 can store the location history in a database in memory by capturing, for example, the GPS location data from system 120 over a period of time.

The technique may include performing an analysis between context data 440 of request 470 and a history in connection with system 120 and/or a subject key 450. For example, engine 530 performs an analysis between data 440 and the history based on previous requests from system 120 stored in the database.

The technique generates score 550, output 540, and/or response 480 based on an analysis between data 440 of request 470 and the history in connection with engine 520. It will be appreciated that score 550, output 540, and/or response 480 can be used for authenticating the user. The authentication result may be based on score 550 based on at least one risk factor. It will be appreciated that in this embodiment the result of the analysis between data 440 of the request and the history is one factor. Risk score 550 may form part of the response 480 sent to system 120 via the communications medium. In one embodiment, risk score 550 enables granting or denying access to one or more keys 450 in response to the risk score exceeding or not exceeding a predefined threshold.

It will be appreciated by those skilled in the art that the risk score generated by the risk engine may be based on a set of Bayesian weights each of which corresponds to data 440 in connection with request 470.

It will be appreciated that during operation the technique can perform an analysis of request 470 and data 440 with respect to a particular time. It will also be appreciated that request 470 and/or data 440 may have a timestamp associated therewith enabling analysis by engine 530 with the history at that particular time. The risk engine 530 generates risk score 550 based on the analysis.

Additionally, it will be appreciated that system 110 may be configured to infer patterns of time and location. For example, it will be appreciated that the time and location may frequently correspond enabling the risk engine to identify patterns of behavior. In this way, the risk engine will be able to use such information when generating a risk score.

Moreover, it will be appreciated that system 110 may be configured to infer at least some of context data 440. For example, if a user is located in a certain location at 09.00 hours to 17.00 hours it can be determined by the risk engine that the user is at work and a risk score is generated accordingly.

Furthermore, it will be appreciated that system 110 may be configured to extract information from context data 440 in order to further challenge the user. For example, if the current location is determined to be a location at work the user may be further challenged with a question such as "what is the name of your employer?"

Moreover, it will be appreciated that the adaptive authentication server may be configured to include a user profile which may be combined with or form part of context data 440 in connection with request 470. For example, if the user has never left the U.S.A., the aforementioned travel detail with respect to the user may be included in the user profile meaning that if the current location of request 470 is in Europe the risk engine will be configured to generate a much higher risk score.

Furthermore, system may be configured for recognizing that certain context data 440, e.g., pertaining to certain locations, indicates a greater threat. For example, it will be appreciated that certain countries, or areas within a metropolitan area, may be treated as being of greater threat than others. The risk engine may be configured to take this into account when generating a risk score. In addition, it will be appreciated that certain countries or areas within a metropolitan area may be transiently subject to additional risk factors. For example, a temporary influx of people may be expected in an area due to a large sporting event, concert or the like.

With respect to system 110, system 110 may be, include, or be included in a server, storage device, etc., that has a physical communications port for making a connection to a physical security device (PSD) (e.g., smart token) which may form at least a portion of system 110. The computerized system also has an interface to a communications link for communicating with a user, such as a system administrator, operator, technician, etc. The PSD is a user-removable device which may be administratively associated with the user and/or with keys 450, and the PSD is used in connection with request 470 and accessing keys 450 to enable either selected key related operations or key related access to resources. In this context, "user-removable" refers to both portability (small and lightweight) as well as modular connectability (easily insertable and removable to/from a user-accessible physical port such as a USB port, Ethernet port, wireless port etc. of system 110). A good example of a physical realization of the PSD is a palm-size device with a USB connector and a housing in which an electronic circuit module is disposed, similar to a so-called "memory stick" or "USB memory" device.

Generally, in an example implementation, operation of the system 110 of FIGS. 1-2 involves the user connecting the PSD to a port, and the system using keys or resources stored on the PSD (as well as information from request 470 and other information) to enable certain key protected operations to be performed. The scope of protection may be anywhere in a range from very specific (e.g., allowing the user to perform some specific configuration command not otherwise permitted) to very general (e.g., enabling overall access to encrypted data). As one specific example, the system 110 may be a storage device (e.g., storage array or controller) of a storage system which provides encrypted data storage for other system elements (servers, etc.). The PSD may store encrypted versions of master keys 450 that are required to enable the storage device to decrypt a set of data encryption keys that are used to encrypt/decrypt the user data stored by the storage system. In such a system, the storage device can only operate as intended upon accessing and using the encrypted master keys stored on the PSD to encrypt/decrypt the lower-level data encryption keys.

Logic 420 provides some level of protection to prevent unauthorized use of the PSD and keys 450. Before system 110 relies upon the presence of the keys 450 to enable one or more protected functions, it may use the PSD perform an authentication procedure based on engine 520 and/or engine 530 as described herein by which request 470 is verified or validated. Only if such verification/validation is successful is the use of the keys 450 deemed to be authorized, enabling the keys 450 on the PSD to be used for the intended protected functions (such as decrypting data).

Other aspects of an example of PSD are described in co-assigned, co-pending U.S. patent application Ser. No. 12/751,577, filed 31 Mar. 2010, entitled PROVIDING SECURITY MECHANISMS FOR VIRTUAL MACHINE IMAGES, which patent application is hereby incorporated herein by reference for all purposes.

It should be understood that risk-based authentication performed in connection with the technique described herein, in some embodiments, is capable of utilizing RSA® Adaptive Authentication which is offered by EMC Corporation of Hopkinton, Mass. Certain aspects of RSA® Adaptive Authentication relate to risk-based authentication (RBA) and fraud detection which involve measuring over one hundred risk indicators to identify high-risk and suspicious activities. Certain aspects of RSA® Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching banking behavioral patterning profiles and inputs from our fraud intelligence teams that locate compromised IP addresses and accounts.

At least some aspects of an example of a risk engine and a risk score for use with the technique described herein are described in co-assigned, co-pending U.S. patent application Ser. No. 13/340,829, filed 30 Dec. 2011, entitled METHOD OF DEFINING THE USER'S GEOGRAPHIC AREAS FOR RISK ASSESSMENT PURPOSES IN MOBILE CHANNELS, and Ser. No. 13/017,158, filed 31 Jan. 2011, entitled COUNTING DISTINCT OCCURRENCES OF A FACT USING MOVING STATISTICS WINDOW, which patent applications are hereby incorporated herein by reference for all purposes.

While various embodiments of the invention have been particularly shown and described, those skilled in the art will know that various changes in form and details may be made therein without departing from the spirit and scope of the invention as defined by the appended claims.

What is claimed is:

1. A method comprising steps of:
   receiving a request for a key that serves as part of a data security system that limits a number of accesses to key or keys associated therewith, wherein the request comprises one or more attributes associated with the request;
   analyzing the one or more attributes associated with the request and a history in connection with one or more previous requests;
   based on the analysis, determining a riskiness in connection with the request, wherein the riskiness indicates a high risk in connection with the request; and
   upon determining the high risk in connection with the request, determining to refuse the request and creating a new limit that reduces the number of accesses to key or keys associated with the data security system;
   wherein the steps are performed by at least one processing device comprising a processor coupled to a memory.

2. An apparatus comprising:
   at least one processing device comprising a processor coupled to a memory;
   said at least one processing device being configured to:
      receive a request for a key that serves as part of a data security system that limits a number of accesses to key or keys associated therewith, wherein the request comprises one or more attributes associated with the request;
      analyze the one or more attributes associated with the request and a history in connection with one or more previous requests;
      based on the analysis, determine a riskiness in connection with the request, wherein the riskiness indicates a high risk in connection with the request; and
      upon determining the high risk in connection with the request, determine to refuse the request and create a new limit that reduces the number of accesses to key or keys associated with the data security system.

3. An article of manufacture comprising a processor-readable non-transitory storage medium having stored therein program code of one or more software programs, wherein the program code when executed by at least one processing device causes said at least one processing device to:
   receive a request for a key that serves as part of a data security system that limits a number of accesses to key or keys associated therewith, wherein the request comprises one or more attributes associated with the request;
   analyze the one or more attributes associated with the request and a history in connection with one or more previous requests;
   based on the analysis, determine a riskiness in connection with the request, wherein the riskiness indicates a high risk in connection with the request; and
   upon determining the high risk in connection with the request, determine to refuse the request and create a new limit that reduces the number of accesses to key or keys associated with the data security system.

\* \* \* \* \*